(12) United States Patent
Brunolli

(10) Patent No.: US 10,461,643 B1
(45) Date of Patent: Oct. 29, 2019

(54) COMPOSITE EMBEDDED VOLTAGE REGULATOR (CEVR)

(71) Applicant: nanoHenry, Inc., San Diego, CA (US)

(72) Inventor: Michael Brunolli, Escondido, CA (US)

(73) Assignee: nanoHenry, Inc., San Diego, CA (US)

( * ) Notice: Subject to any disclaimer, the term of this patent is extended or adjusted under 35 U.S.C. 154(b) by 0 days.

(21) Appl. No.: 16/375,676

(22) Filed: Apr. 4, 2019

Related U.S. Application Data

(60) Provisional application No. 62/652,772, filed on Apr. 4, 2018.

(51) Int. Cl.
| | |
|---|---|
| *H02M 3/158* | (2006.01) |
| *G06F 1/28* | (2006.01) |
| *G05F 1/46* | (2006.01) |
| *H02M 3/156* | (2006.01) |
| *H02M 1/00* | (2006.01) |

(52) U.S. Cl.
CPC .......... *H02M 3/1584* (2013.01); *G05F 1/465* (2013.01); *G06F 1/28* (2013.01); *H02M 2001/0009* (2013.01); *H02M 2001/0045* (2013.01); *H02M 2003/1566* (2013.01)

(58) Field of Classification Search
CPC ....... H02M 3/1584; H02M 2001/0019; H02M 2001/008; H02M 1/102; H02M 2001/0045; H02M 2003/1566; G06F 1/26
See application file for complete search history.

(56) References Cited

U.S. PATENT DOCUMENTS

| | | |
|---|---|---|
| 8,890,737 B2 | 11/2014 | Schrom et al. |
| 9,003,209 B2 | 4/2015 | Sizikov et al. |
| 9,014,637 B1 | 4/2015 | Skinner et al. |
| 9,122,467 B2 | 9/2015 | Dinh et al. |
| 9,154,026 B2 | 10/2015 | Schrom et al. |
| 9,229,466 B2 | 1/2016 | Saraswat et al. |
| 9,256,238 B1 | 2/2016 | Kotikalapoodi |
| 9,367,114 B2 | 6/2016 | Wells et al. |
| 9,389,628 B2 | 7/2016 | Herbison et al. |

(Continued)

OTHER PUBLICATIONS

Kurd, N et al., "Haswell: A family of IA 22 nm Processors", IEEE J of Solid-State Circuits, vol. 50, No. 1, Jan. 2015, p. 49-58.

(Continued)

*Primary Examiner* — Harry R Behm
(74) *Attorney, Agent, or Firm* — Law Office of Gerald Maliszewski; Gerald Maliszewski

(57) ABSTRACT

A system and method are provided for supplying bulk current to a voltage regulator embedded on a system-on-chip (SoC). An embedded voltage regulator (EVR) supplies a regulated voltage to a functional unit, the current demand is determined, and a current control signal is generated. An off-SoC bulk current source accepts the current control signal and supplies auxiliary (bulk) current to the functional unit in response to the current control signal. For example, in a first period of time a dynamic increase demand for a first current. Initially the EVR supplies the first current and creates an increase in SoC thermal loading. Subsequently, the EVR supplies a current less than the first current while the bulk current source supplies the bulk of the current. As a result, the bulk current source creates an off-SoC thermal load.

24 Claims, 8 Drawing Sheets

(56) References Cited

U.S. PATENT DOCUMENTS

| | | | | |
|---|---|---|---|---|
| 2013/0275936 A1* | 10/2013 | Abhishek | ............ | G06F 17/5036 |
| | | | | 716/113 |
| 2015/0081125 A1* | 3/2015 | Bose | ..................... | G06F 1/3287 |
| | | | | 700/291 |
| 2015/0222182 A1* | 8/2015 | Searles | ............... | H02M 3/1588 |
| | | | | 327/541 |
| 2017/0338662 A1* | 11/2017 | Sutton | ....................... | H02J 4/00 |

OTHER PUBLICATIONS

Lambert W et al., "Package Inductors for Intel Fully Integrated Voltage Regulators", IEEE Trans on Comp, Pack, and Manu Tech, vol. 6, No. 1, Jan. 2016, p. 3-10.

Sturcken N et al., "A Switched-Inductor Integrated VOltage Regulator with Nonlinear Feedback and Network . . . ", IEEE J of Solid-State Circuits, vol. 47, No. 8, Aug. 2012, 1935-1945.

Rivas, L et al., "New Architectures for Radio-Frequency DC-DC Power Conversion", IEEE Trans on Power Electronics, vol. 21, No. 2, Mar. 2006, p. 380-393.

\* cited by examiner

COMPOSITE EMBEDDED VOLTAGE REGULATOR (CEVR)

RELATED APPLICATIONS

Any and all applications, if any, for which a foreign or domestic priority claim is identified in the Application Data Sheet of the present application are hereby incorporated by reference under 37 CFR 1.57.

BACKGROUND OF THE INVENTION

1. Field of the Invention

This invention generally relates to power supplies and, more particularly, to a system-on-chip (SoC) embedded voltage regulator (EVR) with an off-chip auxiliary bulk current source (BCS).

2. Description of the Related Art

Recent years have seen a move away from centralized alternating current (AC)-to-direct current (DC) power supplies to decentralized (distributed) power systems that use DC-to-DC converters near their point of use. The major driving force has been the decrease in core voltages. These low voltages at high currents are forcing the power conversion industry to reevaluate conventional circuit topologies, component selection, and packaging concepts. The point of load (POL) or point of use (POU) requirement has arisen from computer hardware developments, but it is being seen throughout the semiconductor industry wherever microprocessors, SoCs, application processors (APs), or digital signal processors (DSPs) are implemented, and it is present especially in telecom base stations and network infrastructure.

FIGS. 1A and 1B are schematic block diagrams depicting two fundamental POL configurations (prior art). POL converters are a popular solution for applications in which circuits require low voltages of 3.3 volts (V) and below. The demand for these types of voltage levels stems from the requirement for lower core voltages, and it is obvious that the current capability for these converters will increase even if the power capability stays the same. This has several implications for the power supply circuitry, including the need to route low-voltage high current around a printed circuit board. This leads to relatively large voltage drops, higher power consumption, and large printed circuit board (PCB) tracks, and can result in poor output regulation. Typically, there are several voltage levels required across a PCB card, and these can range from 5 V down to 0.9 V, resulting in the need for multi-output converters or several POL converters. FIG. 1A depicts a single "front-end" converter that steps an input voltage down to several different lower voltages. FIG. 1B depicts a two-step conversion process.

The power supply integrity requirements of modern high performance system-on-chips (SoCs) are extremely challenging in terms of loads and slew rates. Conventional POL solutions are no longer able to meet those needs. The main problem being that the impedance of the power delivery network (PDN) is too high to meet the voltage stability requirements.

FIG. 2 is a schematic block diagram a SoC with an embedded voltage regulator (EVR) (prior art). One leading solution to the PDN issue is to embed a high frequency multi-phase EVR onto the same silicon die as the load. This choice also saves costs by simplifying the remaining PDN, and requires fewer capacitors and a smaller area, as well as easier routing.

FIG. 3 is an exemplary EVR enabled as a switch-mode power supply (SMPS) using a BUCK configuration. The switching rate must be fairly high since the output filter must use the limited on-chip capacitance (as shown), although extra capacitors can be integrated on the SoC package or on the printed circuit board (PCB), which are useful for filtering the lower frequency components. The input voltage of the EVR is limited by the SoC technology, often to twice the desired output voltage, which is actually desirable for the output noise. With two or more active phases the noise is minimized. More phases can be activated (n potential output voltage paths are shown) to supply more current as needed. The high frequency and multiple (n) phases permit the EVR to meet the stringent voltage integrity needs of the highest performance SoCs. The control circuit may, for example as shown, be a pulse width modulator (PWM). Feedback to the compensator is typically used to regulate the gating of the switches.

FIG. 4 is a schematic block diagram of an SoC with an EVR capable of operating at eight phases (prior art). The phases are typically operated as pairs with up to sixteen inductors (phases). In this example, inductors L1 through L8 are mounted outside the SoC on the integrated circuit package. One capacitor C1 is mounted on, or built into the package and a second capacitor C2 is internal to the SoC. C2 represents the parasitic capacitance on the supply bus, plus any additional capacitors connected between the supply and ground. In the SoC, the CPUs are loads that typically have a complex and dynamic impedance, meaning that the current draw is "as required". Shown are four CPUs, two of which are powered by head switches (HSs). The head switches reduce power when the CPUs are off and can be enabled quickly to bring extra CPU power online, creating the possibility of very fast changes in load current. In one aspect, the head switches are enabled by FETs able to quickly disconnect a circuit from power in order to reduce leakage current.

The downside of the EVR solution is twofold. First, an extra thermal burden is created on the SoC and, second, because the EVR adds another regulator in series with the load, a generally lower overall conversion efficiency results. The added thermal load results from the energy losses of the EVR. Most of the EVR loss occurs on the SoC die, with the rest of the loss occurring in the inductors, which adds to the package thermal load. These energy losses are primarily from the AC energy needed to turn on and off the inductor switches and the DC conduction losses of those switches, inductors, and connections. If the EVR was 90% efficient, which is difficult to achieve, the result would be an on-die power dissipation increase of over 10%. The problem is slightly non-linear and worsens, as a percentage, as power levels reach their maximum. The EVR power dissipation represents a larger thermal burden on the SOC silicon substrate, which triggers thermal mitigation mechanisms sooner than non-EVR systems. Regarding the overall system efficiency, EVR solutions are challenged by the losses of the switches, but mainly due to the need of the off-chip first stage regulator to provide the compatible input voltage to the EVR. Even if the first stage regulator was 93% efficient, the product of the first stage regulator and EVR would be less than 85% efficient.

The EVR switches present several challenges. First, given that the SoC is in a nanometer process, a very low series resistance is hard to achieve. A large number of interlevel metal layers means a large number of via stacks, and extremely large metal dimensions are needed to obtain low resistances low. Low resistance requires proportionately larger AC power to drive the switches. These high AC and DC losses make it difficult for EVR solutions to achieve even 88% efficiency. When combined with the first stage, the overall result is 82% total efficiency.

It would be advantageous if the thermal load associated with the use of an EVR could be displaced off the SoC.

It would be advantageous if an EVR could deliver power to the SoC load with higher efficiency.

SUMMARY OF THE INVENTION

The present invention is a composite voltage regulator that consists of an on-die or system-on-chip (SoC) embedded voltage regulator (EVR) for controlling voltage regulation, operating in conjunction with an off-die current controlled bulk current source that is responsible for delivering a majority of the current needed by on-die functional units. Being off-die, the thermal load created by the bulk current source is necessarily off-die, while the function of the EVR creates a minimal thermal load on the die. Further, since the bulk current source is not limited by the size constraints of being embedded on the die, it can be designed for greater efficiency and made using more efficient components (e.g., transistor switches). In one aspect the EVR is a multiphase switch-mode power supply buck or buck-boost. Advantageously from the standpoint of efficiency and overvoltage protection, the EVR may be a buck/back boost EVR.

Accordingly, a method is provided for supplying bulk current to a voltage regulator embedded on a SoC. The method provides an embedded functional unit (e.g., a load such as a central processing unit (CPU)) and an EVR. The EVR supplies a regulated voltage to the functional unit and the current demanded by the functional unit is determined. In response to determining the current demanded by the functional unit, a current control signal is generated. An off-SoC bulk current source accepts the current control signal and supplies auxiliary (bulk) current to the functional unit in response to the current control signal. The current is "auxiliary" in the sense that it is not necessarily always being supplied. However, the bulk current source, when engaged, is able to supply the majority of the current demanded by the functional unit. Typically, the EVR operates at a faster switching frequency and longer duty cycle than the bulk current source, and has a lower output supply impedance than the bulk current source.

For example, in a first period of time a dynamic increase demand for a first current occurs. At some point it becomes advantageous for the SoC to begin accepting current from the bulk current source. Thus, in an initial portion of the first period of time, the EVR supplies the first current and creates an increase in SoC thermal loading in accordance with a SoC thermal time constant. In a subsequent portion of the first time period the EVR supplies a second current less than the first current while the bulk current source supplies a third current, equal to the first current minus the second current. In supplying the second current, the SoC thermal load decreases. Rather, the bulk current source creates an off-SoC thermal load in response to supplying the bulk of the current (the third current) needed by the functional unit. Later, in a second period of time when a dynamic decrease demand is determined for a fourth current, the EVR supplies the fourth current and the bulk current source ceases to supply current.

Typically, the SoC may be mounted on a motherboard with the bulk current source, system energy source (e.g., battery) supplying a first voltage, and a board level pre-EVR regulator. The board level pre-EVR regulator converts the first voltage to a regulated second voltage, less than the first voltage. The EVR converts the second voltage to a third voltage, less than the second voltage, and the combination of the board level pre-EVR regulator and EVR supply current at a first efficiency. The bulk current source converts the first voltage to the third voltage and supplies current at a second efficiency, greater than the first efficiency. In one aspect, the board level pre-EVR regulator supplies the current control signal to the bulk current source in the form of the current being delivered to the EVR and the level of the second voltage. Otherwise, the current control signal may be supplied by the EVR or by a scheduling module of the operating system (OS).

Additional details of the above-described method, a composite EVR (CEVR), and a SoC designed for composite embedded voltage regulation are provided below.

DETAILED DESCRIPTION

Figures 1A, 1B:
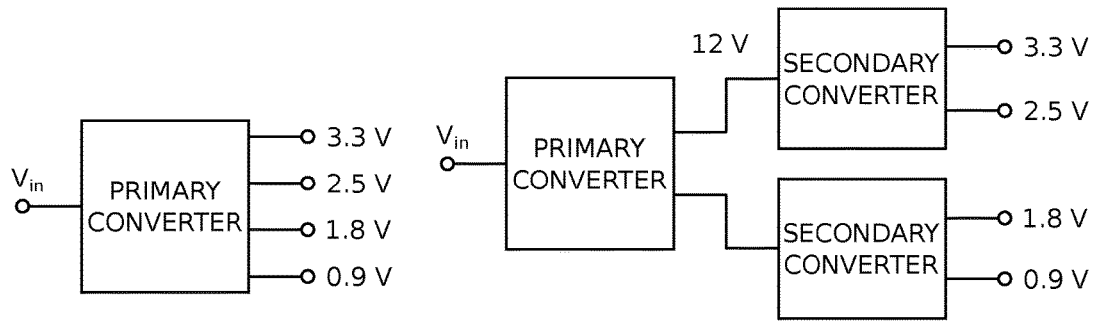
FIGS. 1A and 1B are schematic block diagrams depicting two fundamental POL configurations (prior art).
Figure 2:
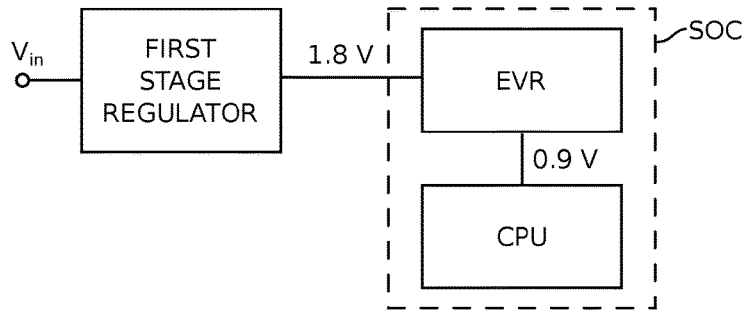
FIG. 2 is a schematic block diagram a SoC with an embedded voltage regulator (EVR) (prior art).
Figure 5:
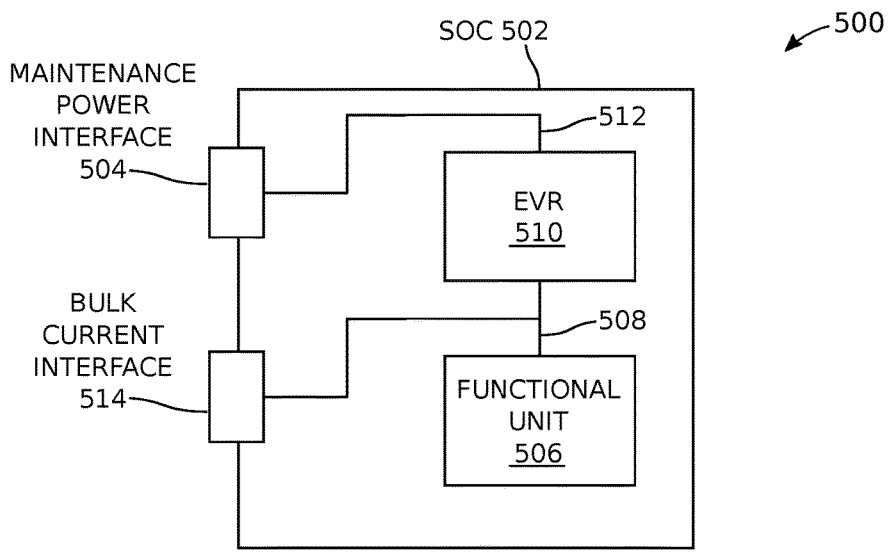
FIG. 5 is a schematic block diagram depicting a composite embedded voltage regulator (CEVR).
Figure 3:
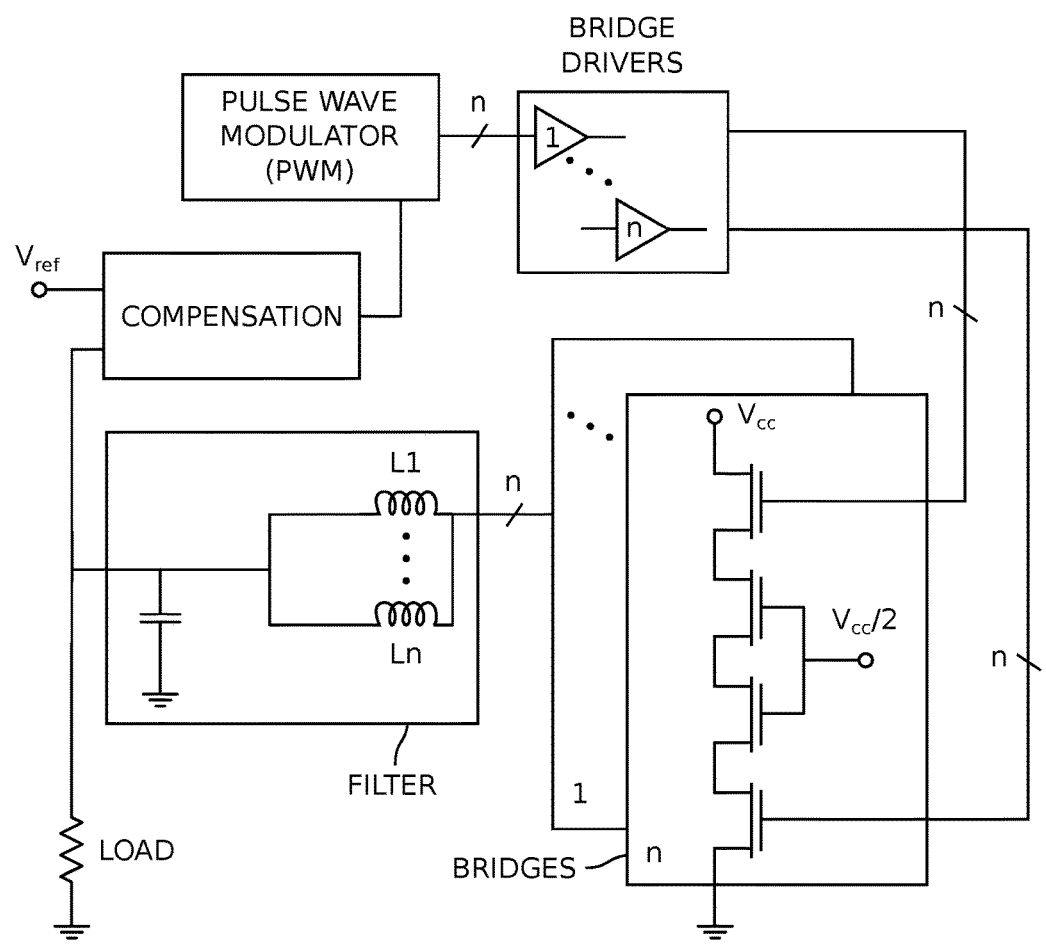
FIG. 3 is an exemplary EVR enabled as a switch-mode power supply (SMPS) using the BUCK configuration.

FIG. 5 is a schematic block diagram depicting a composite embedded voltage regulator (CEVR). The CEVR 500 comprises a system-on-chip (SoC) 502. As used herein, a SoC is a system of connected electrical circuits fabricated on a single, one-piece die or substrate, which is typically a silicon material, but may alternatively be another semiconductor material such as silicon-germanium (SiGe) for example. The SoC 502 may also be referred to as an integrated circuit (IC). As such, the single substrate and SoC are both represented by reference designator 502. The SoC 502 has a maintenance power interface 504 and a functional unit 506 (e.g., a central processing unit (CPU)) formed on the substrate, having an input supply on line 508 to accept power. Although not shown, the functional unit may comprise a group of CPU cores sharing the same input supply.

When operating at top speed a typical CPU can only operate in a narrow range of voltages. For example, a voltage of 1.1 volts may cause a loss of reliability, while a voltage of less than 1 volt may cause the system to fail in meeting timing requirements, resulting in a "crash". At the same time, the input impedance of a CPU is usually wide ranging and very dynamic, meaning that for a given supply voltage the amount of current required can change dramatically in a very short amount of time.

Figure 4:
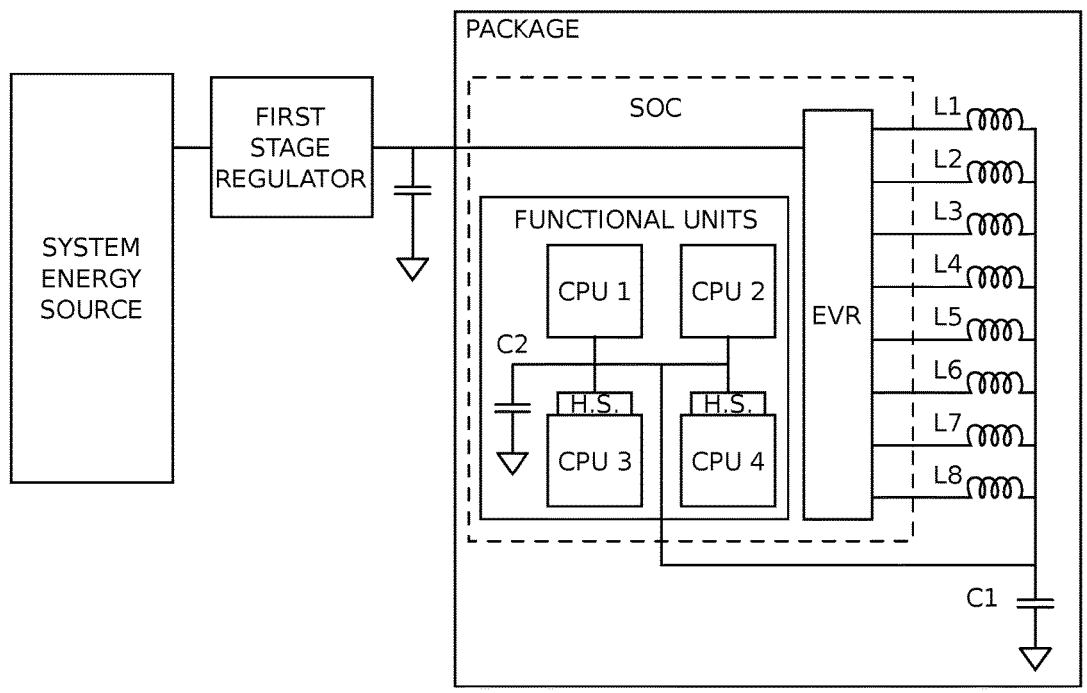
FIG. 4 is a schematic block diagram of a SoC with an EVR capable of operating at eight phases (prior art).

A SoC embedded voltage regulator (EVR) 510 is formed on the substrate 502, with an input supply on line 512 connected to the maintenance power interface 504 to accept a voltage, and with an output supply connected to the functional unit input supply on line 508 to provide a predetermined regulated voltage. For simplicity, it is assumed that the EVR inductor and capacitor filter components are internal, but not shown. However, as shown in FIG. 4, the inductors and capacitors making up the EVR filter may be formed on the package or board on which the SoC is mounted. Generally, the EVR 510 uses high switching speeds, multiple output phases, and a high control loop frequency to deliver a fast changing and wide range of currents to the functional unit while limiting voltage variations. A bulk current interface 514 is also connected to the functional unit input supply on line 508. The bulk current interface 514 accepts auxiliary current in response to functional unit current demands. In prior art devices, such an interface may exist for connection to a board level filter capacitor or to act as a test point.

Figure 6B:
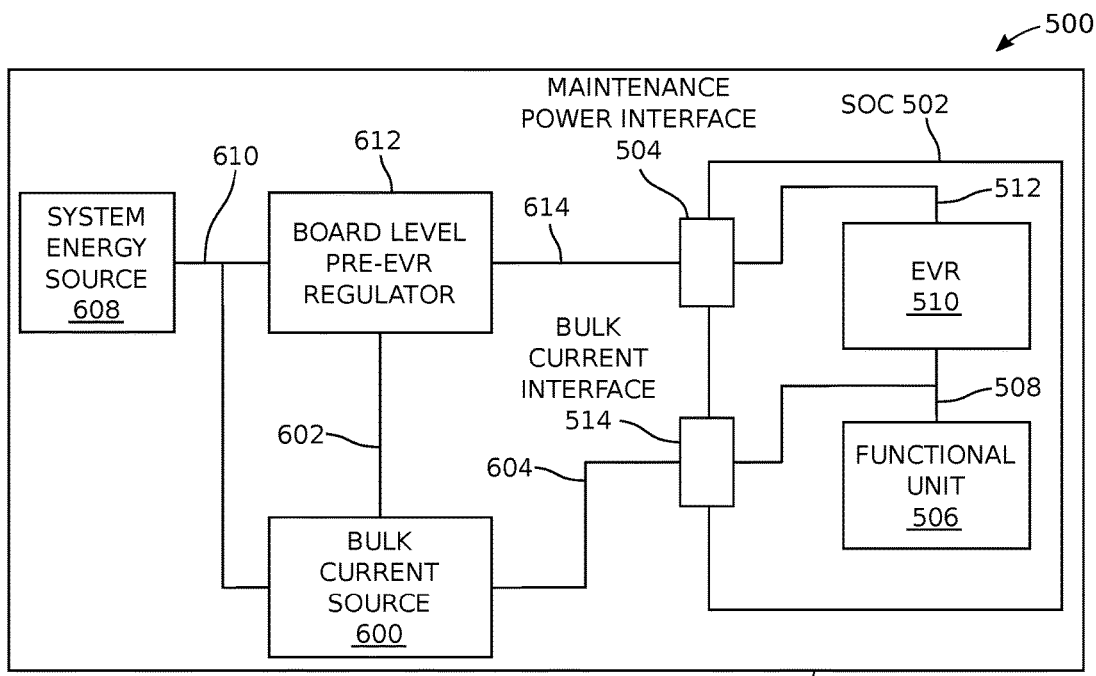
FIGS. 6A and 6B are schematic block diagrams of the CEVR of FIG. 5 with the addition of a bulk current source.
Figure 6A:
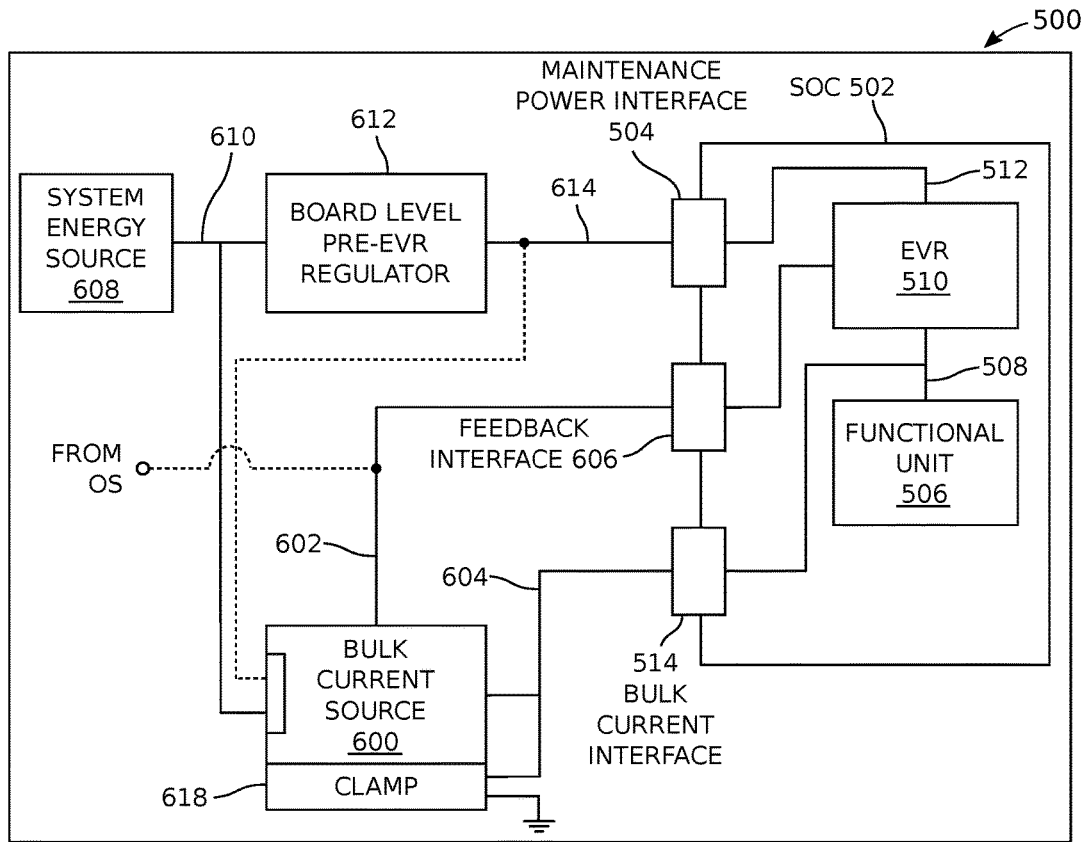

FIGS. 6A and 6B are schematic block diagrams of the CEVR of FIG. 5 with the addition of a bulk current source. The bulk current source 600 has a control input on line 602 to accept a current control signal responsive to the functional unit current demand. The bulk current source 600 has an output supply connected to the SoC bulk current interface on line 604 to supply current to the functional unit input supply on line 508 in response to the current control signal. The current supplied by the bulk current source 600 may be called "auxiliary" in the sense that it is not necessarily always being supplied. However, as explained in more detail below, the bulk current source, when engaged, is able to supply the majority of the current demanded by the functional unit 506. The bulk current source may be one of many different possible devices. Although the bulk current source is not a conventional voltage regulator, it may generally understand to be an active device able to supply power, voltage, or current to the SoC, upon command, in a manner that reduces the SoC thermal load, as explained below. The response time of the bulk current source is relatively slow compared to the EVR, and it regulates its duty cycle based upon the voltage level at the input of the functional unit and the current being delivered by the EVR. In some aspects, the bulk current source duty cycle is responsive to apriori information received from a scheduling module of the operating system (OS), not shown. As shown in FIG. 6A, the SoC 502 further comprises a feedback interface 606 connected to the bulk current source control input on line 602. The EVR 510 has a control output on line 608 connected to the feedback interface 606 to supply the current control signal.

Optionally, as shown with the phantom line, the current control signal may be supplied by the scheduling module of the OS, as the scheduling module has apriori information of what the functional unit current demands will be. This includes rapid increases and decreases in current control override.

In one aspect, the EVR is a buck/back boost EVR. As such, the EVR is able to perform the conventional functions of a buck EVR. The back boost function acts as overvoltage protection for the regulated voltage being supplied to the functional unit, and in addition, the "excess" current is rerouted back to the EVR maintenance power interface to further improve efficiency.

As another option, the bulk current source 600 may include a clamp 618 connected to the bulk current source output supply on line 604 to act as overvoltage protection, to prevent the regulated voltage being supplied to the functional unit from exceeding a predetermined level.

Referencing either FIG. 6A or 6B, a system energy source 608, such as a battery for example, may have a system supply output on line 610 to provide a first voltage. Although only one voltage output from the system energy source is shown, in some aspects not shown, a low voltage may be supplied to the board level pre-EVR regulator and a higher voltage to the bulk current source to further improve efficiency. Otherwise, the system energy source may be an AC-to-DC converter that coverts an AC voltage to one or more DC voltages. Some typical DC voltages are +12 V, −12V, +5 V, and +3.3 V, delivered at up to hundreds of watts of power. For example, a laptop computer may use a multi-cell battery delivering a DC voltage in the range of 20 to 12 volts, while a mobile device may use a multi-cell battery providing 3.7 to 4.2 volts. A board level pre-EVR regulator 612 has an input supply connected to the system energy source system supply output on line 610 to accept the first voltage and an output supply connected to the SoC maintenance power interface on line 614 to provide a second voltage, lower than the first voltage. Since the EVR can only accept a narrow range of input voltages due to the limits of silicon processes, a first stage or board level pre-EVR regulator is typically needed to convert the system energy source voltage down to a more practical value or 2 volts or less. Thus, the EVR output supply on line 508 provides a third voltage that is typically lower than the second voltage. The bulk current source 600 also has an input supply connected to the system energy source system supply output on line 610 to accept the first voltage. Alternatively, as shown with a phantom line in FIG. 6A, the bulk current source may accept input power from the board level pre-EVR regulator on line 614. Advantageously, this arrangement still acts to minimize the SoC thermal load, although the efficiency of the system may be less than if power is supplied directly from the system energy source.

In one aspect, the bulk current source 610 and SoC 502 are mounted on the motherboard 616 and connected via motherboard substrate interconnections. Typically, the motherboard is a printed circuit board (PCB) upon which are mounted ICs, SoCs, transistors, passive components, and connectors. The motherboard PCB may be multi-layered and includes conductive traces that permit the above-mentioned components to communicate. The board level pre-EVR regulator 612 would typically be mounted on the same motherboard 616, and in some aspects the motherboard would also include the system energy source 608, as shown. The combination of the system energy source 608, board level pre-EVR regulator 512, and EVR 510 supplies current at the third voltage with a first efficiency. In contrast, the combination of the system energy source 608 and bulk current source 600 supply current at the third voltage with a second efficiency, greater than the first efficiency.

As shown in FIG. 6B, optionally the board level pre-EVR regulator 612 may comprise a feedback output connected to the bulk current source control input on line 602 to supply the current control signal. This current control signal includes the current being supplied to the maintenance power interface 504 and the second voltage level on line 614.

Referencing either FIG. 6A or 6B, the EVR 510 may be a switch-mode power supply (SMPS) operating at a first switching frequency. The bulk current source 600 may also be a SMPS, such as a current controlled power supply operating at a second switching frequency, slower than the first switching frequency. Typically, the first switching frequency is in the range of 10 to 100 times faster than the second switching frequency. In accordance with being current controlled, the impedance of the bulk current source output supply on line 604 is greater than the impedance of the EVR output supply on line 508. Typically, the bulk current source output impedance is in the range of 10 to 100 times greater than the EVR output impedance. If the EVR 510 operates at a first duty cycle, the bulk current source 600 operates at a second duty cycle, shorter than the first duty cycle. As a result, the noise component of the current supplied by the EVR 510 may be as much as 50% smaller than the noise component of the current supplied by the bulk current source 600.

Figure 7:
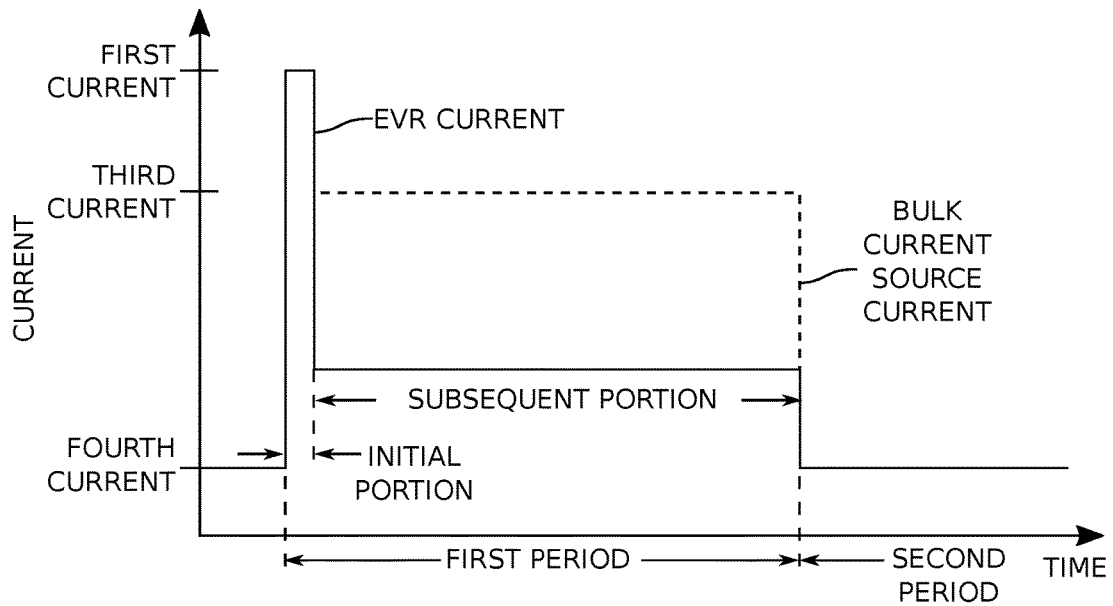
FIG. 7 is a graph depicting an exemplary scenario in which the bulk current source is engaged.

FIG. 7 is a graph depicting an exemplary scenario in which the bulk current source is engaged. In a first period of time, the functional unit creates a dynamic increase demand for a first current. The current control signal may, for example, be responsive to an absolute current value, a relative current value measured against a recent average, differential change in current demand, or apriori knowledge of impending functional unit current demands. In an initial portion of the first period of time, the EVR supplies the first current. In a subsequent portion of the first period of time the EVR supplies a second current less than the first current and the bulk current source supplies a third current equal to the first current minus the second current. In a second period of time following the first period of time, the functional unit creates a dynamic decrease demand for a fourth current. The EVR supplies the fourth current in the second period of time, and the bulk current source ceases to supply current in the second period of time.

Figure 8:
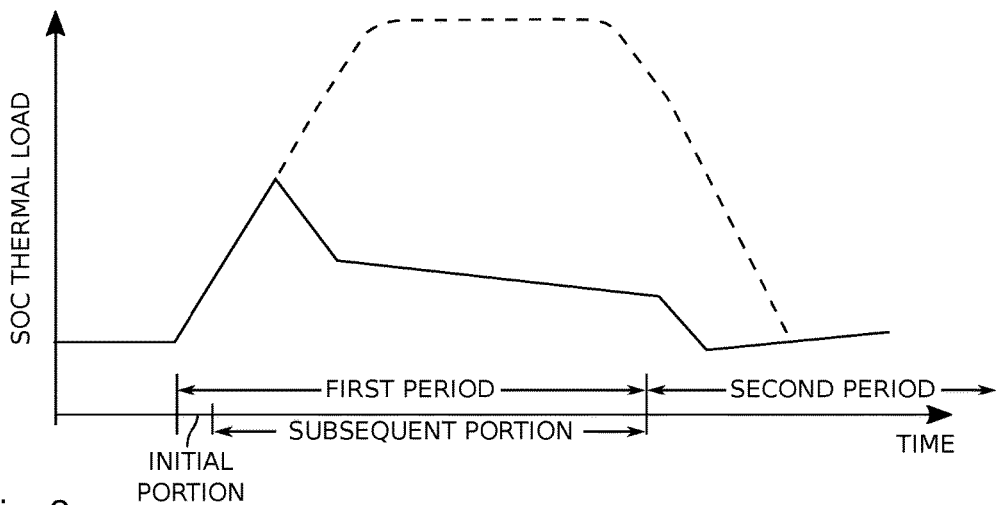
FIG. 8 is a graph depicting the SoC thermal load resulting from the current demand scenario of FIG. 7.

FIG. 8 is a graph depicting the SoC thermal load resulting from the current demand scenario of FIG. 7. In response to supplying the first current, the EVR creates an increase in SoC thermal loading during the initial portion of the first period of time in accordance with a SoC thermal time constant. In response to supplying the second current in the subsequent portion of the first period of time, the SoC thermal load decreases. The bulk current source creates on off-SoC thermal load in the subsequent portion of the first period of time. Note, the thermal time constants are typically much slower than the changes in current demand. Shown in phantom is the SoC thermal load that would occur without auxiliary current supplied by the bulk current source.

The bulk or primary current source, added in parallel to the EVR, boosts efficiency and reduces the EVR's thermal load on the SoC. The EVR uses its high speed on-die control and switches to maintain tight regulation of the voltage of targeted functional blocks on the SoC. The parallel power source provides current with a response that is averaged over time and controlled in such a way as to reduce the amount of average power delivered by the EVR. Normally, the operation of a conventional EVR results in losses dependent on the load current being delivered, with higher current deliveries resulting in extra power dissipation caused by the EVR itself.

The use of a controlled bulk current source allows the EVR to operate with lower losses that are nearly independent of the total current being delivered. The additional bulk current source may convert energy directly from a system energy source, such as a battery, using state-of-the-art power switches to achieve maximum efficiency. If the system energy source delivers three quarters of the total power at 93% efficiency and EVR now only delivers one quarter of the power on average, the total efficiency soars to over 90%. At the same time, the thermal load on the SoC is reduced to less than one quarter of the conventional burden.

Figure 9:
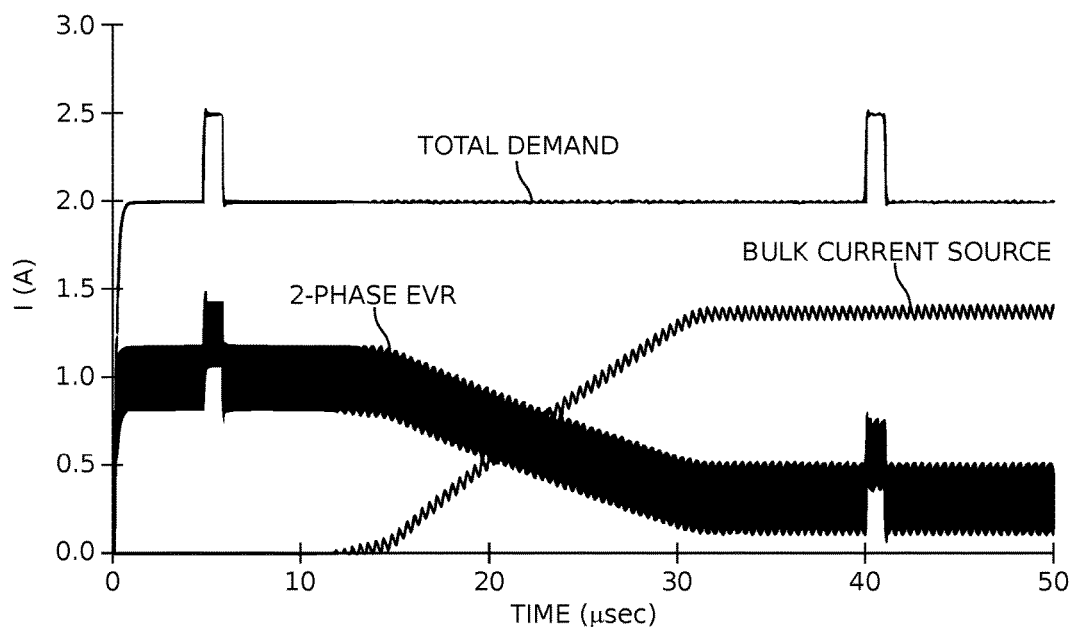
FIG. 9 is a graph depicting an exemplary interaction of EVR and bulk current source currents.

FIG. 9 is a graph depicting an exemplary interaction of EVR and bulk current source currents. At time 0 the functional unit creates a demand for 2 amps (A) of current, which spikes to 2.5 A at approximately 5 microseconds (µs) and returns to 2 amps at approximately 6 µs. In the time between 0 and approximately 12 µs, the EVR satisfies this demand. In this example the EVR is a two-phase design, with half the current demand, in this case 1 amp, being satisfied by each phase. Each EVR current phase has large ripples but since they are 180 degrees apart, the ripples cancel out. At approximately 12 µs the bulk current source begins to meet the demand and EVR reduces the current it supplies so that the combination of the bulk current and lesser EVR current satisfies the total demand. After 30 µs the bulk current source is supplying 1.4 amps. Thus, each phase of the EVR is supplying 0.3 amps on average to meet the total demand of 2 amps. The functional load creates a second current demand spike of 2.5 amps at 40 µs, and the demand returns to 2 amps at approximately 41 µs.

Figure 10:
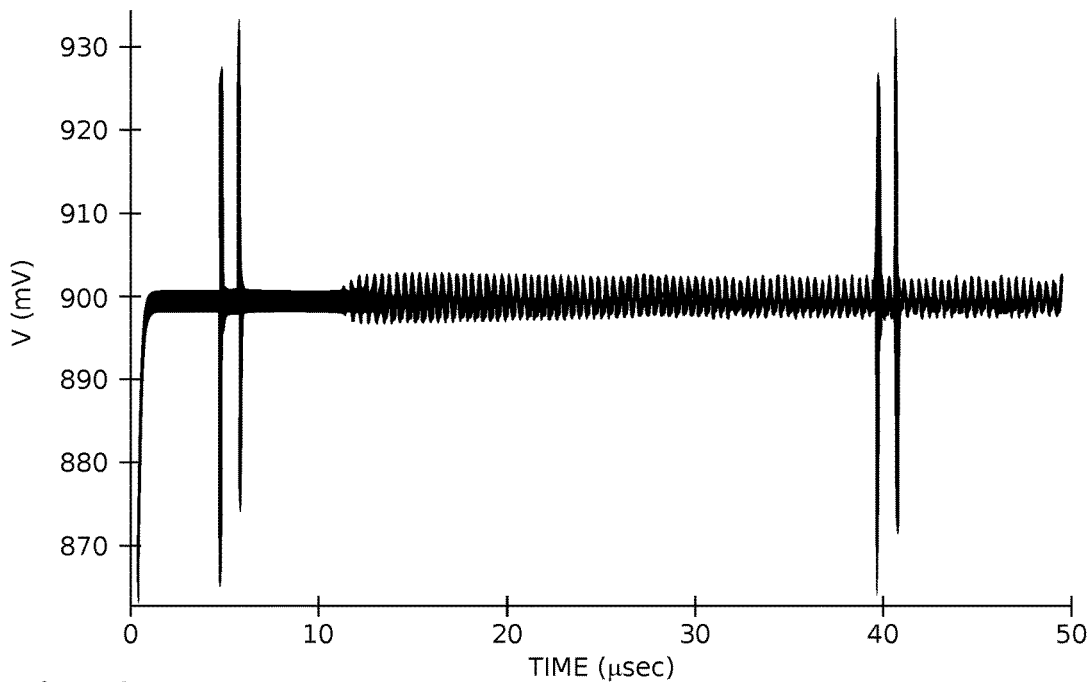
FIG. 10 is a graph depicting ripple on the voltage supplied to the function load, based on the scenario of FIG. 9.

FIG. 10 is a graph depicting ripple on the voltage supplied to the function load, based on the scenario of FIG. 9. As can be seen, the voltage noise is low before 5 µs. When the first current spike occurs, the fast response of the EVR limits the voltage dip to less than 40 millivolts (mV). After approximately 12 µs the noise on the voltage regulated by the EVR increases a modest controlled amount in response to the ripple of the bulk current. When the second current spike occurs at approximately 40 µs, the EVR is able to respond to limit the voltage dip to less than 40 mV, the same as without interference from the bulk current source.

Figure 11:
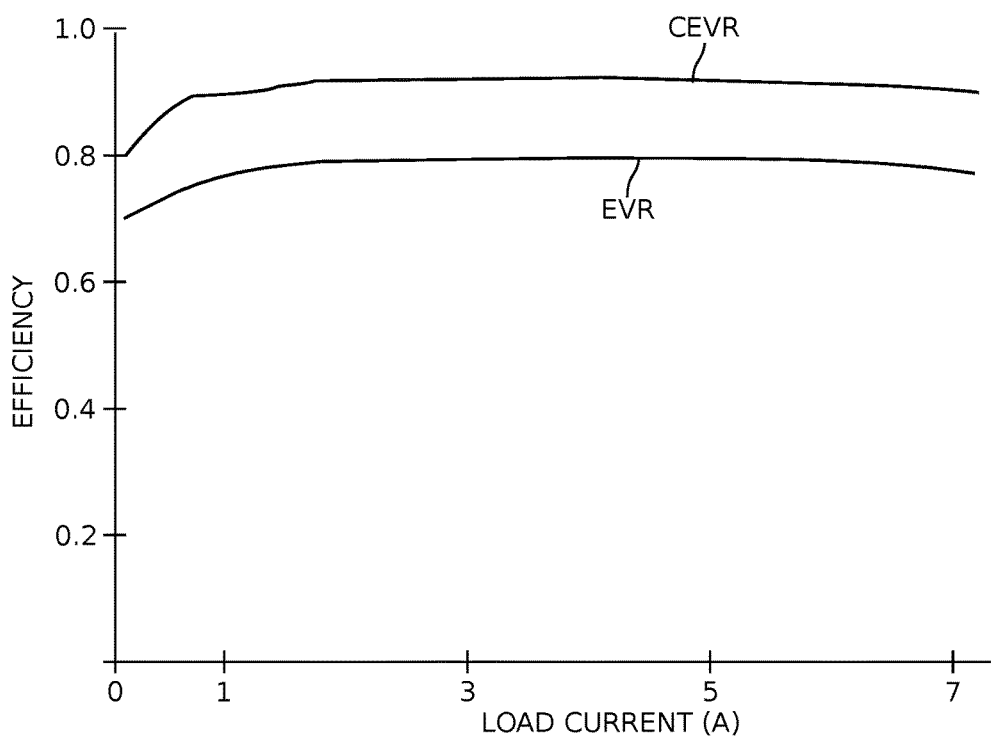
FIG. 11 is a graph comparing EVR to CEVR (EVR plus bulk current source) efficiency as a function of current demand.

FIG. 11 is a graph comparing EVR to CEVR (EVR plus bulk current source) efficiency as a function of current demand. Generally, the use of the bulk current source increases efficiency by a factor of 10%.

Figure 12:
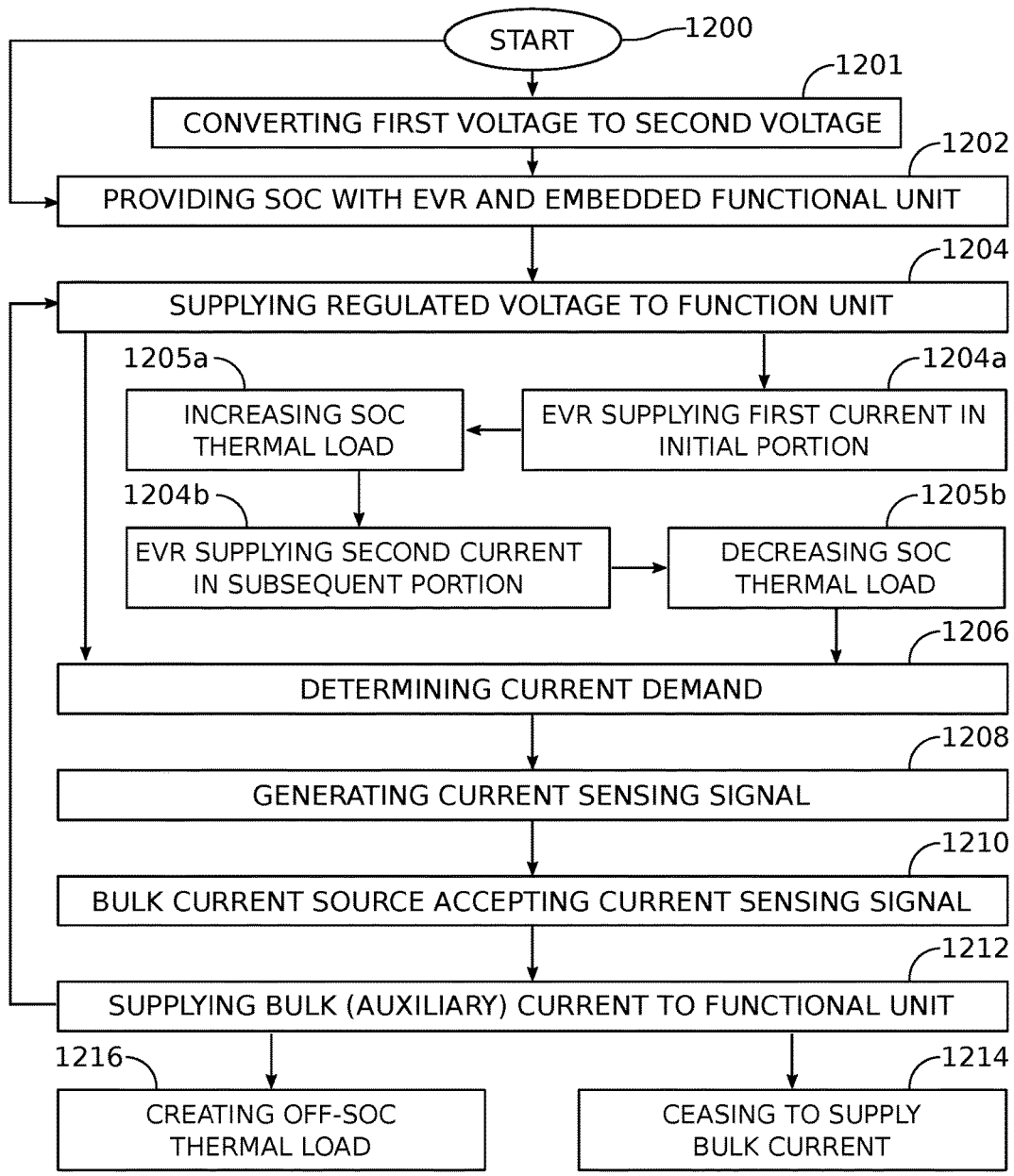
FIG. 12 is a flowchart illustrating a method for supplying bulk current to a voltage regulator embedded on a SoC.

FIG. 12 is a flowchart illustrating a method for supplying bulk current to a voltage regulator embedded on a SoC. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps, with application to the CEVR described in FIGS. 5 through 11. The method starts at Step 1200.

Step 1202 provides a SoC comprising an embedded functional unit and an EVR. In Step 1204 the EVR supplies a regulated voltage to the functional unit (e.g., a CPU). Step 1206 determines functional unit current demand. In response to determining the functional unit current demand, Step 1208 generates a current control signal. In Step 1210 an off-SoC bulk current source accepts the current control signal, and in Step 1202 the bulk current source supplies auxiliary current to the functional unit in response to the current control signal. As noted above, the EVR is typically a SMPS with a faster switch frequency, longer duty cycle, and lower output impedance than the bulk current source.

Referencing FIGS. 12 and 7, in one aspect, determining the functional unit current demand in Step 1206 includes, in a first period of time, measuring a dynamic increase demand for a first current. Then, the EVR supplying the regulated voltage in Step 1204 includes substeps. In an initial portion of the first period of time, the EVR supplies the first current in Step 1204a. In a subsequent portion of the first period of time, the EVR supplies a second current less than the first current. The bulk current source supplying the auxiliary current in Step 1212 includes the bulk current source supplying a third current, equal to the first current minus the second current, in the subsequent portion of the first period.

In a different aspect, measuring the current demanded by the functional unit in Step 1206 includes, in a second period of time following the first period of time, measuring a dynamic decrease demand for a fourth current level. Then in Step 1204 the EVR supplies the fourth current in the second period of time, and in Step 1214 the bulk current source ceases to supply current in the second period of time.

In response to supplying the first current in the initial portion of the first period of time, the EVR creates an increase in SoC thermal loading in Step 1205a, in accordance with a SoC thermal time constant. In response to supplying the second current in the subsequent portion of the first period of time, in Step 1205b the SoC thermal load decreases. In Step 1216 the bulk current source creates an off-SoC thermal load in the subsequent portion of the first period of time.

In another aspect, in Step 1201 a board level pre-EVR regulator converts a first voltage to a regulated second voltage, less than the first voltage, and in Step 1204 the EVR converts the second voltage to a third voltage, less than the second voltage, so that the combination of the board level pre-EVR regulator and EVR supply current at a first efficiency. In contrast, supplying the auxiliary (bulk) current in Step 1212 includes the bulk current source converting the first voltage to the third voltage and supplying current at a second efficiency, greater than the first efficiency. In one variation, the bulk current source accepting the current control signal in Step 1210 includes the bulk current source receiving a current control signal from the board level pre-EVR regulator, with the current control signal including the current being supplied to the EVR and the second voltage level. Alternatively, the bulk current source receives the current control signal from the EVR or from an OS scheduling module in Step 1210.

Figure 13:
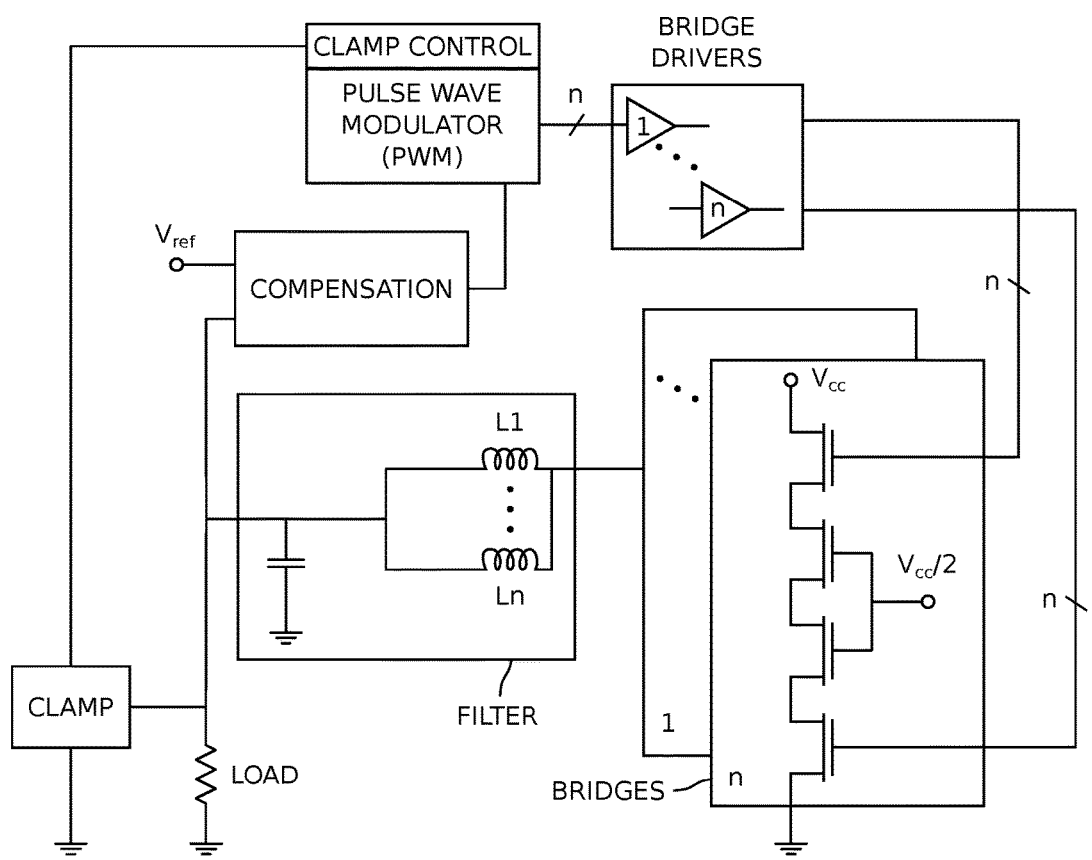
FIG. 13 is a schematic block diagram of an EVR enabled with a clamp control circuit connected to the EVR output supply.

FIG. 13 is a schematic block diagram of a EVR enabled with a clamp control circuit connected to the EVR output supply. The clamp is enabled in the event that the voltage on the EVR output supply line exceeds the regulated voltage required by the functional unit. While the clamp circuit, e.g., a FET, may create an additional thermal load and inefficiency, it would typically be enabled for only short periods of time, e.g., 1 millisecond, so the additional thermal load would be small. A CEVR system and method have been presented for providing primary auxiliary current to a SoC with an EVR. Examples of particular processes and hardware units have been presented to illustrate the invention. However, the invention is not limited to merely these examples. Other variations and embodiments of the invention will occur to those skilled in the art.

I claim:

1. A composite embedded voltage regulator (CEVR) comprising:
    a system-on-chip (SoC) comprising:
        a single substrate having a maintenance power interface;
        a functional unit formed on the substrate, having an input supply to accept power;
        an embedded voltage regulator (EVR) formed on the substrate, having an input supply connected to the maintenance power interface to accept a voltage, and having an output supply connected to the functional unit input supply to provide a regulated voltage;
        a bulk current interface connected to the functional unit input supply;
    a bulk current source having a control input to accept a current control signal responsive to the functional unit current demand, and an output supply connected to the SoC bulk current interface to only supply current to the functional unit input supply when enabled in response to the current control signal;
    wherein the functional unit, in a first period of time, creates a dynamic increase demand for a first current;
    in an initial portion of the first period of time, the EVR supplying the first current; and,
    in a subsequent portion of the first period of time:
        the EVR supplying a second current less than the first current;
        the bulk current source supplying a third current equal to the first current minus the second current;
    wherein the functional unit, in a second period of time following the first period of time, creates a dynamic decrease demand for a fourth current, less than the third current;
    wherein the EVR supplies the fourth current in the second period of time; and,
    wherein the bulk current source ceases to supply current in the second period of time.

2. The CEVR of claim 1 wherein the EVR operates at a first switching frequency; and,
    wherein the bulk current source is a current controlled power supply operating at a second switching frequency, slower than the first switching frequency.

3. The CEVR of claim 2 wherein the EVR operates at a first duty cycle; and,
    wherein the bulk current source operates at a second duty cycle, shorter than the first duty cycle.

4. The CEVR of claim 1 wherein the EVR, in response to supplying the first current, creates an increase in SoC thermal loading during the initial portion of the first period of time in accordance with a SoC thermal time constant; and,
    wherein the EVR, in response to supplying the second current in the subsequent portion of the first period of time, decreases the SoC thermal load.

5. The CEVR of claim 4 wherein the bulk current source creates on off-SoC thermal load in the subsequent portion of the first period of time.

6. The CEVR of claim 1 further comprising:
    a system energy source having a system supply output to provide a first voltage;
    a board level pre-EVR regulator having an input supply connected to the system energy source system supply output to accept the first voltage and an output supply connected to the SoC maintenance power interface to provide a second voltage, lower than the first voltage;
    wherein the EVR output supply provides a third voltage, lower than the second voltage;
    wherein the combination of the system energy source, board level pre-EVR regulator, and EVR supply current at the third voltage with a first efficiency; and, wherein the bulk current source has an input supply connected to the system energy source system supply output to accept the first voltage, and wherein the combination of the system energy source and bulk current source supply current at the third voltage with a second efficiency, greater than the first efficiency.

7. The CEVR of claim 6 wherein the board level pre-EVR regulator further comprises a feedback output connected to the bulk current source control input to supply the current control signal responsive to the current being supplied to the maintenance power interface and the second voltage level.

8. The CEVR of claim 1 wherein the SoC further comprises a feedback interface connected to the bulk current source control input; and,
wherein the EVR has a control output connected to the feedback interface to supply the current control signal.

9. The CEVR of claim 1 wherein the EVR output supply has a first impedance; and,
wherein the bulk current source output supply has a second impedance, greater than the first impedance.

10. The CEVR of claim 1 wherein the functional unit is a central processing unit (CPU).

11. The CEVR of claim 1 further comprising:
a motherboard;
wherein the bulk current source and SoC are mounted on the motherboard and connected via motherboard substrate interconnections.

12. The CEVR of claim 1 wherein the bulk current source receives the current control signal from an operating system (OS) scheduling module.

13. The CEVR of claim 1 wherein the EVR is a buck/back boost EVR capable of rerouting current to the maintenance power interface to prevent the supply of a voltage greater than the regulated voltage.

14. The CEVR of claim 1 wherein the EVR includes a shunt clamp circuit connected to the EVR output supply to prevent the supply of a voltage greater than the regulated voltage.

15. The CEVR of claim 1 wherein the bulk current source includes a shunt clamp circuit connected to the bulk current source output supply to prevent the supply of a voltage greater than the regulated voltage.

16. A method for supplying bulk current to a voltage regulator embedded on a system-on-chip (SoC), the method comprising:
providing a SoC comprising an embedded functional unit and an embedded voltage regulator (EVR);
the EVR supplying a regulated voltage to the functional unit;
determining functional unit current demand;
in response to the functional unit current demand, generating a current control signal;
an off-SoC bulk current source accepting the current control signal;
the bulk current source only supplying auxiliary current to the functional unit when enabled in response to the current control signal;
wherein determining the functional unit current demand includes, in a first period of time, determining a dynamic demand increase for a first current;
wherein the EVR supplying the regulated voltage includes:
in an initial portion of the first period of time, the EVR supplying the first current;
in a subsequent portion of the first period of time, the EVR supplying a second current less than the first current;

wherein the bulk current source supplying the auxiliary current includes the bulk current source supplying a third current, equal to the first current minus the second current, only in the subsequent portion of the first period;
wherein determining the functional unit current demand includes, in a second period of time following the first period of time, determining a dynamic decrease demand for a fourth current level;
wherein EVR supplying the regulated voltage includes the EVR supplying the fourth current in the second period of time; and,
the method further comprising:
the bulk current source ceasing to supply current in the second period of time.

17. The method of claim 16 wherein the EVR supplying the regulated voltage includes the EVR operating at a first switching frequency; and,
wherein the bulk current source supplying the auxiliary current includes the bulk current source being a current controlled power supply operating at a second switching frequency, slower than the first switching frequency.

18. The method of claim 17 wherein the EVR supplying the regulated voltage includes the EVR operating at a first duty cycle; and,
wherein the bulk current source supplying the auxiliary current includes the bulk current source operating at a second duty cycle, shorter than the first duty cycle.

19. The method of claim 16 further comprising:
in response to supplying the first current in the initial portion of the first period of time, the EVR creating an increase in SoC thermal loading in accordance with an SoC thermal time constant; and,
in response to supplying the second current in the subsequent portion of the first period of time, the SoC thermal load decreasing.

20. The method of claim 19 further comprising:
the bulk current source creating an off-SoC thermal load in the subsequent portion of the first period of time.

21. The method of claim 16 further comprising:
a board level pre-EVR regulator converting a first voltage to a regulated second voltage, less than the first voltage;
wherein the EVR supplying the regulated voltage to the functional unit includes the EVR converting the second voltage to a third voltage, less than the second voltage, where the combination of the board level pre-EVR regulator and EVR supply current at a first efficiency; and,
wherein the bulk current source supplying the auxiliary current includes the bulk current source converting the first voltage to the third voltage and supplying current at a second efficiency, greater than the first efficiency.

22. The method of claim 21 wherein the bulk current source accepting the current control signal includes the bulk current source receiving a current control signal from the board level pre-EVR regulator responsive to the current being supplied to the EVR and the second voltage level.

23. The method of claim 16 wherein the bulk current source accepting the current control signal includes the bulk current source receiving the current control signal from a source selected from the group consisting of the EVR and an operating system (OS) scheduling module.

24. The method of claim 16 wherein the EVR supplying the regulated voltage to the functional unit includes the EVR having an output supply with a first impedance; and, wherein the bulk current source supplying the auxiliary current includes the bulk current source having an output supply with a second impedance, greater than the first impedance.

* * * * *